April 1, 1958 — E. D. HILLEBRAND — 2,828,919
SIMPLIFIED AUTOMATIC CONTROL FOR RANGE
Filed Sept. 26, 1955 — 2 Sheets-Sheet 1

INVENTOR.
EARL D. HILLEBRAND
BY
*his attorneys*

April 1, 1958 E. D. HILLEBRAND 2,828,919
SIMPLIFIED AUTOMATIC CONTROL FOR RANGE
Filed Sept. 26, 1955 2 Sheets-Sheet 2
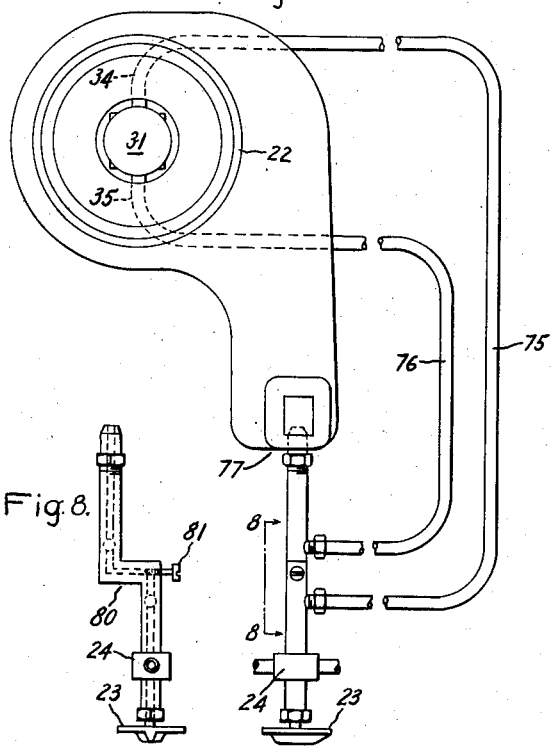
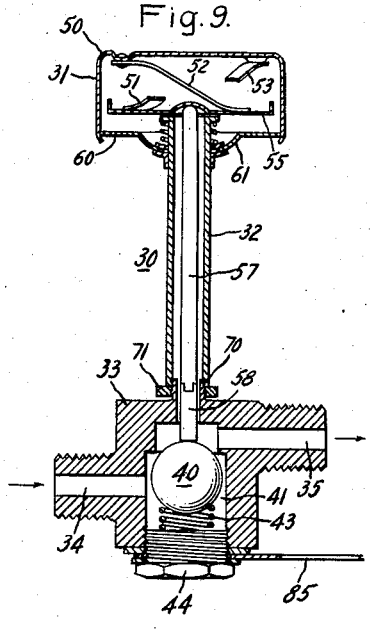
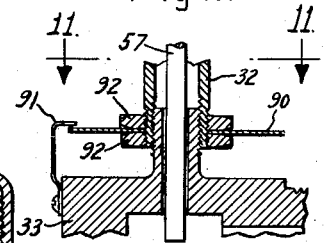
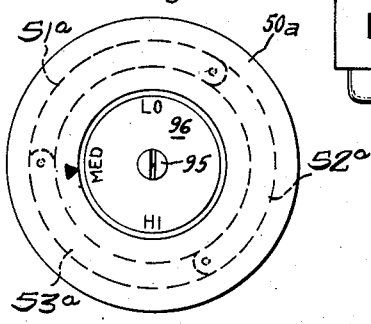
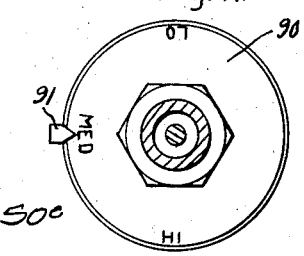
INVENTOR
EARL D. HILLEBRAND
BY
Carlson Pitzner Hubbard & Wolfe
his attorneys United States Patent Office 2,828,919
Patented Apr. 1, 1958

2,828,919

SIMPLIFIED AUTOMATIC CONTROL FOR RANGE

Earl D. Hillebrand, Kankakee, Ill., assignor to Florence Stove Company, Gardner, Mass., a corporation of Massachusetts Application September 26, 1955, Serial No. 536,411

12 Claims. (Cl. 236—33)

The present invention relates to ranges and more particularly to means for controlling the temperature of a griddle or other cooking utensil.

It is the general object of the present invention to provide an improved temperature control for the top burners on a range which is capable of regulating the gas flame in accordance with the temperature of a cooking utensil, particularly a deep fat fryer, skillet or griddle. It is an object, more specifically, to provide a device which possesses many of the advantages of the arrangement described and claimed in my prior application, Serial No. 464,257, filed October 25, 1954, but which is simpler and cheaper to manufacture.

It is another object to provide an automatic control which permits manual control of the gas below the automatic control point, thus making it possible for the gas burners to be used in the normal way for most cooking operations and enabling the control to be applied, if desired, to all of the top burners of a gas range. It is a related object to provide an automatic control for a top burner which is simple to use and which can be employed by one familiar with an ordinary gas range without confusion and without requiring special instruction. It is a further object to provide an automatic control which limits the temperature of a utensil to the normal frying temperature and which thus provides a safety device which is constantly effective to prevent scorching and damage to cooking vessels.

It is another object to provide a temperature control for a top burner which comprises a self-contained unit suitable for mounting directly at the burner, which has a minimum of moving parts, and which may be easily installed and serviced.

It is still another object to provide a temperature control for a gas burner which has a novel temperature-sensitive head which is quickly and accurately responsive to changes in temperature, i. e., to changes in demand for gas, and which is positive in operation. It is a further object to provide a temperature-responsive head employing a novel bimetal construction and which is swivel mounted to maintain good thermal contact with a cooking utensil, and in which accuracy of control is preserved regardless of the angle of the head.

It is another object to provide a temperature control device having novel means for adjusting the control point.

It is an object to provide a temperature control arrangement for a top burner which is applicable to conventional ranges and which requires a minimum of modification of existing designs.

Finally, it is an object to provide a temperature control arrangement which possesses features and advantages which are far out of proportion to the cost.

Other objects and advantages of the invention will become apparent upon reading the attached detailed description and upon reference to the drawings, in which:

Fig. 7 is a plan view of a burner control unit and associated piping.

Fig. 8 is a fragmentary view of the bypass arrangement taken along the line 8—8 in Fig. 7.

Fig. 9 is a view similar to Fig. 4 but showing the valve unseated as it is when the cooking utensil is being brought up to the desired temperature.

Fig. 10 is a fragmentary sectional view showing a simple arrangement for adjusting the temperature.

Fig. 11 is a plan view taken along the line 11—11 in Fig. 10.

Fig. 12 is a fragmentary vertical section taken through a modified temperature sensing head.

Fig. 13 is a plan view of the device shown in Fig. 12.

Fig. 14 is a fragmentary section similar to Fig. 12 but showing a still further modification of a temperature sensing head which may be employed in connection with my invention.

Fig. 15 is a fragmentary side elevation of the device shown in Fig. 14.

While the invention has been described in connection with certain preferred embodiments, it will be understood I do not intend to limit the invention to such embodiments but intend to cover all modifications and alternative constructions which may be included within the spirit and scope of the appended claims.

Figure 1:
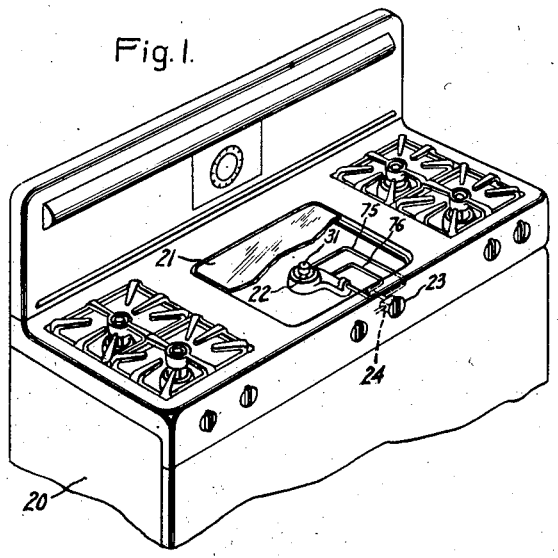
Figure 1 shows a range having a griddle arranged for thermostatic control in accordance with the present invention and with the griddle in partial section.

Turning now to Figure 1, a range 20 is shown having a griddle 21 heated by a burner 22 which is connected via a manual valve 23 to a supply line or header 24. Arranged centrally within the burner 22 and in contact with the underside of the griddle 21 is a thermostatic control device 30 having a head 31, a stem or pedestal 32 and a valve body 33.

Figure 4:
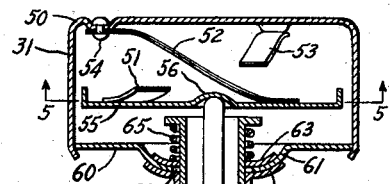
Fig. 4 shows the control device in vertical section to bring out the details of construction.
Figure 4:
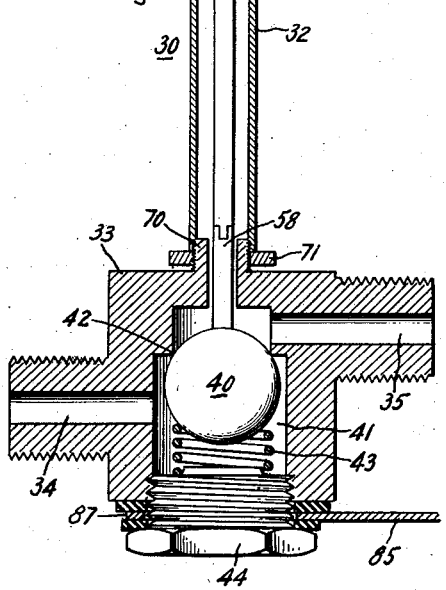
Figure 5:
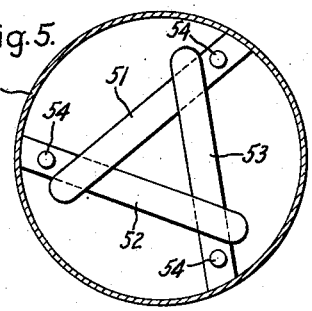
Fig. 5 is a plan view of the bimetal strips taken along the line 5—5 in Fig. 4.
Figure 6:
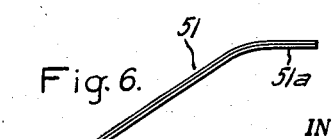
Fig. 6 is an enlarged view of a single bimetal strip.

In order to understand the control device 30 in detail and to appreciate its features and advantages reference is made to Figs. 4–6. Here it will be noted that the valve body 33 has an inlet 34 and an outlet 35. For the purpose of controlling flow of gas between the inlet and the outlet, a valve member in the form of a ball 40 is provided within a central aperture 41, the ball being urged upwardly against a valve seat 42 by means of a spring 43. To support the spring and to provide access to the space 41, a plug 44 is screwed into the underside of the valve body.

For the purpose of controllably unseating the valve in order to modulate the gas flow, the head 31 includes an inverted cup-shaped contact member 50 mounting temperature-responsive means in the form of bimetallic strips 51, 52, 53. These strips are arranged symmetrically as shown in Fig. 5 in overlapping triangular relation with the upper ends of each of the strips being thermally coupled to the underside of the contact member 50. The strips are in the present instance cantilever-mounted, being secured to the member 50 by rivets 54 so that they apply pressure at spaced points about the periphery of a circular equalizing plate 55. Centered under the equalizing plate and received in a dimple or depression 56 formed therein is a push rod 57. The latter engages a plunger 58 which presses directly against the ball 40 previously referred to.

In order to permit relative rocking movement of the head 31 on the stem 32, the contact member 50 has a mounting plate 60 providing a partial ball-and-socket connection with the pedestal 32. In the present instance the ball portion of the connection comprises a spherical boss 61 formed at the center of the plate 60 and having a central aperture 62. A socket is provided by correspondingly shaped retaining members in the form of collars 63, 64 mounted on the pedestal and engaging opposite sides of the boss 61. The upper retaining member 63 is slidably mounted and is pressed downwardly by a spring 65 to provide a small amount of friction in the joint.

In accordance with one of the aspects of the invention the swiveling of the ball-and-socket joint takes place about a center which coincides substantially with the point of contact between the equalizing plate 55 and the push rod 57. Thus, limited tilting movement of the head 31 may occur without corresponding movement of the push rod and without affecting the position of the valve element 40 or accuracy of the control.

For the purpose of setting the control point, i. e., to adjust the temperature which will automatically be maintained by the thermostat, provision is made for adjusting the relative height of the pedestal thereby to vary the position of the push rod 57 relative to the valve body which exists at a given temperature. In the present instance this is accomplished by providing a threaded connection 70 between the pedestal and the valve body 33. After the desired position of the pedestal has been determined by screwing it upwardly or downwardly, it is fixed in position by means of a lock nut 71.

Prior to reviewing a cycle of operation of the device shown in Fig. 4 reference will be made to Figs. 7 and 8 which show typical gas connections. Here it will be noted that a U-shaped gas line 75 is connected between the manual valve 23 and the inlet 34 of the thermostatic control device. A second U-shaped line 76 arranged parallel thereto connects the outlet 35 of the control device to the inlet 77 of the burner 22. Interposed between the lower ends of the lines 75, 76 and effectively bridging the control device is a bypass 80 having an adjusting screw 81 (Fig. 8). Such bypass permits a small amount of gas to flow to the burner to maintain a minimum flame although the ball valve in the control is closed off tight.

Figure 2:
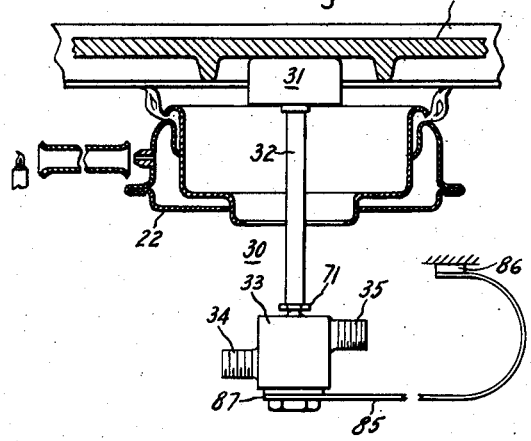
Fig. 2 is a fragmentary section taken through a burner and control device and showing the central portion of the griddle.

The bimetallic strips 51—53 are initially bent into the shape shown in Fig. 6, with the metal 51a of higher coefficient on the bottom. As a result the strips, acting together upon the equalizer plate, expand and contract axially relative to the stem 57. Thus under "cold" conditions, e. g., with the manual valve 23 shut off, the bimetallic strips 51—53 are in the fully curved condition causing the push rod to be in its lowermost position shown in Fig. 9 and with the ball valve member 40 unseated. Turning on the manual valve is effective to cause the flow of gas through the automatic control device into the burner, whereupon ignition will take place from a pilot (Fig. 2) in the usual fashion. As the temperature of the cooking utensil, for example the griddle 21 gradually increases, the temperature of the head rises correspondingly causing the bimetallic strips to flex upwardly. The follow-up action of the spring 43 under such conditions causes the ball 40 to be moved upwardly gradually closing off the flow of gas. It will be apparent that an equilibrium condition will soon be reached in which the amount of gas fed through the valve is just sufficient to maintain the temperature at the desired control point.

In the event that an increased thermal load is imposed, for example by bringing cold food into contact with the utensil, this will be reflected by a slight drop in the temperature of the head whereupon additional gas will be supplied to bring the temperature promptly back to the control point. In the event that a thermal load is removed, the resulting slight increase in temperature of the head will cause the valve 40 to be closed. Under conditions of complete closure gas will be supplied to the burner through the bypass to maintain the flame at a desired minimum level.

Figure 3:
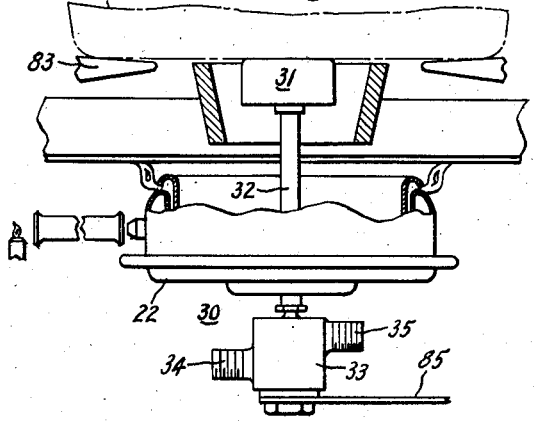
Fig. 3 is a fragmentary view similar to Fig. 2, but showing a griddle replaced by a grate and cooking vessel.

While the device has been discussed thus far in connection with a griddle 21, a grate and conventional utensil such as a skillet may be substituted therefor in accordance with the teachings of my prior patent. This possibility is illustrated in Fig. 3 which shows a grate 83 and skillet 84. The grate is generally located somewhat higher than the griddle. To compensate for the difference in elevation, the entire control device 30 is movable and biased bodily upward. For mounting the control device for vertical movement I prefer to use an elongated C-spring 85 having a fixed end 86 suitably secured to the range structure and a movable end 87 which is secured to the valve body. The valve body may be attached by forming a hole in the end of the spring for reception of the closure plug 44 previously referred to. The U-shaped arrangement of the two gas lines 75, 76 is found to provide sufficient flexibility so that the valve body may freely move through a range of an inch or more. It will be apparent that if additional flexibility is desired it may be provided by using flexible gas lines. In any event the accommodating movement of the automatic control valve takes place automatically and the griddle and grate may be substituted for one another without any particular care or attention on the part of the user.

In the simplified form of device described above the temperature which the device will tend to maintain is fixed. This does not, however, constitute much of a limitation on the use of the burner since a temperature may be chosen which is quite satisfactory for all deep fat frying, skillet frying and griddle frying. Most of the cooking done on a burner is done at temperatures lower than that required for frying; consequently, low burner rates may be obtained by the throttling action of the valve 23 simply by turning the valve 23 towards the "off" position in the normal way. Such manual control permits the use of the burner as a standard top burner for all water cooking operations which are done at temperatures below that used for frying and free of automatic shut-down.

It is therefore one of the features of the present arrangement that the manual control is entirely conventional and it is possible for one to operate the range without any special instruction or experience. Even where the automatic temperature control feature is not used, the device acts as a constant safety device which is effective to cut down the gas flame whenever a utensil runs dry in normal water cookery, thereby reducing scorching and possible damage to the utensil.

While the device operates satisfactorily at a single preset temperature, nevertheless provision may be made if desired for changing the temperature control point. This may be accomplished by making the modification shown in Figs. 10 and 11. Here it will be noted that the stem or pedestal 32 is not locked in position but may be screwed upwardly and downwardly simply by rotating it with the fingers. A circular dial 90 is provided for cooperation with an index or pointer 91 fixed to the valve body, the dial carrying a scale which may, for example, read "low," "medium" and "high." The position of the dial relative to the stem may be initially adjusted and the dial secured in position by means of clamping nuts 92. The instructions accompanying the control device may suggest that the user leave the device in the "medium" setting unless unusual conditions are encountered requiring the use of a higher or lower frying temperature.

A modified adjusting means providing more convenient access is shown in Figs. 12–13. Reference numerals corresponding to the previous embodiment are employed, where applicable, with subscript "a." In this modification, the contact member 50a includes a set of bimetallic strips 51a—53a thermally secured at their upper ends to the contact member and at their lower ends to an equalizer plate 55ₐ. Means accessible from the top of the temperature-sensing head are provided for varying the relation between the plunger or push rod 57ₐ and the pedestal or valve body which exists at a given temperature. In the present instance such means includes an adjusting screw 95 threaded into the center of the equalizer plate and engaging the upper end of the push rod 57ₐ. Mounted at the top of the adjusting screw and secured to it is a rotatable dial 96 which may be calibrated in terms of temperature or which, more conveniently, may carry a scale designating the "low," "medium," and "high" settings just as in the case of the previous embodiment. The screw head and dial are preferably recessed below the contact for all positions of adjustment in order not to affect good thermal contact between the contact member 50ₐ and the underside of the cooking utensil. Using the above arrangement, the temperature setting is at all times visible to the user and easily accessible for adjusting with any convenient tool such as the tip of a table knife. Both this arrangement and that set forth in Figs. 10 and 11 enable the more precise adjustment required to meet extreme conditions such as the quick searing of meat on the one hand or slow frying of eggs on the other.

It will be apparent from the foregoing that the device is a self-contained unit, simple in construction, positive in operation and consisting of a minimum of parts. Consequently, the unit may be constructed at a fraction of the cost of conventional temperature control units of the type disclosed in my prior application. Because of the intimate thermal coupling between the bimetallic elements and the cooking utensil, such elements are quickly and accurately responsive. Furthermore, since a number of bimetallic strips operate in parallel to control the push rod, the total force applied to the valve element is large and operation is positive and reliable over long periods of time. Easy access for cleaning the valve seat is provided by the plug 44, and when replacement finally becomes necessary, it is obviously a simple matter to install a new control unit.

A further form of a temperature sensing head having adjusting means conveniently accessible at the top as shown in Figs. 14 and 15, corresponding reference numerals being used where applicable with the subscript "b." In this modification a contact member consists of two parts 50ᵦ and 50꜀ threaded together as shown. The bimetallic strips, of which two are shown, namely, 51ᵦ, 52ᵦ are arranged the same as those shown in the first embodiment, Figs. 4–6. The strips are riveted to the upper contact member 50ᵦ and the lower ends thereof bear downwardly against a circular equalizer plate 55ᵦ which controls the position of the push rod 57ᵦ.

In order to provide visual indication of the temperature setting, the lower member is provided with an indicator mark preferably in the form of a headed screw 100 and which is movable peripherally in a slot 101 provided in the upper member 50ᵦ as shown in Fig. 15 having "high" and "low" indicia at the opposite ends. The slot 101 is preferably somewhat wider than the head of the screw 100 in order to accommodate axial movement of the member 50ᵦ with respect to the member 50꜀. It will be apparent that the axial movement causes the point of anchoring of the bimetallic strips to be varied relative to the pedestal 32ᵦ which causes a corresponding change in the control point.

In using the device in a practical range the head is initially oriented so that the indicator set screw 100 faces forwardly and so that the temperature indicia are clearly visible for the user of the range. When desiring to change the temperature it is a simple matter to rotate the member 50ᵦ in one direction or the other. In the event that the member 50ᵦ is warm, a pot holder may be used or, if desired, the head can be suitably screw-slotted for reception of a table knife or the like.

I claim as my invention:

1. In a gas range having a source of gas and a top burner, a thermostatic control device for said burner, comprising in combination a head adapted for contacting the underside of a cooking utensil, a valve body having a supporting stem mounted thereon, means providing a universal swivel connection between said head and said stem to permit the head to align itself with the bottom of said utensil, said valve body having an inlet connected to said source as well as an outlet connected to said burner and having a valve member for varying the gas flow, temperature-sensing means in said head arranged to expand and contract axially in response to changes in temperature, and means including a push rod centered in said stem and interposed directly between said sensing means and said valve member for correctively regulating the gas feed to said burner.

2. In a gas range having a top burner, a thermostatic control device arranged for mounting in a centered position relative to the burner comprising, in combination, a head having a contact member of inverted cup-shape, a valve body having an upwardly extending pedestal, means for mounting said head on said pedestal, said valve body having a valve mechanism including an operating plunger extending axially through said pedestal and into said head, an equalizing plate in said head in axial engagement with said plunger, and temperature-responsive means in said head interposed between said contact member and said equalizing plate, said mounting means including a ball-and-socket connection between said head and said pedestal and having a center of rotation at substantially the point of contact between said plunger and said plate.

3. In a gas range having a top burner, a thermostatic control device arranged for mounting in a central position relative to the burner comprising, in combination, a head having a contact member forming the top surface thereof, a valve body having an upwardly extending pedestal, means for mounting said head on said pedestal, said valve body having a valve mechanism including an operating plunger extending axially through said pedestal and into said head, and a temperature-sensing element in said head in intimate thermal engagement with said contact member, said sensing element being in axial engagement with said plunger and arranged to expand and contract in accordance with changes in the temperature thereof, said mounting means including a ball-and-socket connection between said head and said pedestal and having a center of rotation at substantially the point of contact between said plunger and said sensing element.

4. In a gas range a thermostatic control device for engaging the underside of a cooking utensil comprising, in combination, a contact member of inverted cup shape, a disk-shaped equalizer plate mounted within said contact member, a plurality of bimetallic strips in said contact member in symmetrical overlapping relation, one end each of said strips being in contact with said contact member and the other end being in contact with said equalizer plate, each of said strips further having a cantilever mounting at at least one of its ends and a sliding connection at its other end so that the strips upon being subjected to a change in temperature distort in unison to apply pressure on said equalizer plate at spaced points about the periphery thereof, a valve body including inlet and outlet ports together with a valve member for varying the flow of gas between said ports, and a plunger interconnecting said valve member and the center of said equalizer plate for corrective movement of the valve member upon distortion of said bimetallic strips.

5. In a gas range a thermostatic control device for engaging the underside of a cooking utensil comprising, in combination, a contact member of inverted cup shape, an equalizer plate mounted within said contact member, a plurality of bimetallic strips interposed between said contact member and said equalizer plate for applying pressure to the latter at points spaced symmetrically about the periphery thereof, a valve body including inlet and outlet ports together with a valve member for varying the flow of gas between said ports, means securing said contact member and said valve body together in predetermined spaced relation, and a plunger interconnecting said valve member and the center of said equalizer plate for corrective movement of the valve member upon distortion of said bimetallic strips.

6. In a gas range having a top burner and source of gas, a thermostatic control device arranged for mounting centrally in said top burner comprising, in combination, a valve body having an inlet and an outlet arranged for connection to said source and said burner respectively, said valve body having a valve member for varying passage of gas to said burner, a pedestal on said valve body arranged to extend upwardly therefrom, a temperature-sensing head at the top of said pedestal for engaging the underside of a cooking utensil, said head including a temperature-sensing element arranged to expand and contract axially upon changes in temperature, a control plunger arranged axially in said pedestal and coupled to said temperature-sensing element at its upper end and to said valve member at its lower end for correctively regulating the passage of gas in accordance with the temperature, and means including a threaded connection between said pedestal and said valve body for changing the effective length of said pedestal and thereby varying the control point maintained by said control device.

7. In a gas range having a top burner and source of gas, a thermostatic control device arranged for mounting centrally in said top burner comprising, in combination, a valve body having an inlet and an outlet arranged for connection to said source and said burner respectively, said valve body having a valve member for varying passage of gas to said burner, a pedestal on said valve body arranged to extend upwardly therefrom, a temperature-sensing head at the top of said pedestal for engaging the underside of a cooking utensil, said head including a temperature-sensing element arranged to expand and contract axially upon changes in temperature, a control plunger arranged axially in said pedestal and coupled to said temperature-sensing element at its upper end and to said valve member at its lower end for correctively regulating the passage of gas in accordance with the temperature, and means including a threaded connection for varying the position of the plunger relative to the valve body for a given temperature of said temperature-sensing element.

8. In a gas range, the combination comprising a top burner having a source of gas and a manual control valve, a thermostatically controlled valve having a valve body centered within said burner and a rigid pedestal extending upwardly from the body, said pedestal supporting at its upper end a temperature-sensing element for engagement with the underside of a cooking utensil for corrective regulation of gas flow, said thermostatic valve being interposed between said manual valve and said burner, and means for resiliently mounting said valve body so that it is biased upwardly to establish intimate thermal contact between said temperature-sensitive element and the cooking utensil.

9. In a gas range having a top burner and a source of gas, a thermostatic control device arranged for mounting centrally in said top burner comprising, in combination, a valve body having an inlet and an outlet arranged for connection to said source and said burner respectively, said valve body having a valve member for varying passage of gas to said burner and mounting a temperature-sensing head for engaging the underside of a cooking utensil supported above the burner, said head including a contact member and a temperature-sensing element thermally coupled thereto and arranged to expand and contract axially upon changes in temperature, a control plunger in said valve body coupled to said temperature-sensing element at its upper end and coupled to said valve member at its lower end for correctively regulating the passage of gas in accordance with the temperature of the utensil, and means including an adjusting element accessible at the top of said contact member for varying the position of the plunger relative to the valve body for a given temperature of said temperature-sensing element.

10. In a gas range having a top burner and a source of gas, a thermostatic control device comprising, in combination, a valve body having an inlet and an outlet arranged for connection to said source and said burner respectively, said valve body having a valve member for varying passage of gas to said burner, a temperature-sensing head arranged for mounting centrally in said burner for engaging the underside of a cooking utensil supported above the burner, said head including a contact member and a temperature-sensing element thermally coupled thereto and arranged to expand and contract axially upon changes in temperature, means coupled to said temperature sensing element and to said valve member for correctively regulating the passage of gas in accordance with the temperature, and means including an adjusting element accessible at the top of said contact member for adjusting the response of the sensing member.

11. In a gas range having a top burner and a source of gas, a thermostatic control device comprising, in combination, a valve body having an inlet and an outlet arranged for connection to said source and said burner respectively, said valve body having a valve member for varying passage of gas to said burner, a temperature-sensing head arranged for mounting centrally in said burner for engaging the underside of a cooking utensil supported above the burner, said head including a contact member and a temperature-sensing element thermally coupled thereto and having a lower end arranged to expand and contract axially upon changes in temperature, a control plunger for coupling said temperature-sensing element to said valve member for correctively regulating the passage of gas in accordance with the temperature, and means including an adjusting screw mounted in the lower end of said sensing element and accessible at the top of said contact member for varying the relative position of the plunger for a given temperature of said temperature-sensing element.

12. In a gas range having a top burner and a source of gas, a thermostatic control device comprising, in combination, a valve body having an inlet and an outlet arranged for connection to said source and said burner respectively, said valve body having a valve member for varying passage of gas to said burner, a temperature-sensing head arranged for mounting centrally in said burner for engaging the underside of a cooking utensil, said head including a flat contact member and an expansible temperature-sensing element having one end coupled thereto and the other end free to shift toward and from said member as the element contracts and expands upon changes in temperature, means coupled to the movable end of said temperature-sensing element and to said valve member for correctively regulating the passage of gas in accordance with the temperature, means including a threaded member in said head for adjusting the temperature-sensing element relative to the coupling means thereby to vary the control point, and means including indicia on said head for indicating the condition of the threaded means.

References Cited in the file of this patent
UNITED STATES PATENTS

| | | |
|---|---|---|
| 1,001,997 | Scott | Aug. 29, 1911 |
| 1,194,029 | Kercher | Aug. 8, 1916 |
| 1,883,252 | Spencer | Oct. 18, 1932 |
| 2,265,792 | Allen | Dec. 9, 1941 |
| 2,402,997 | Grayson | July 2, 1946 |
| 2,430,196 | Vaughan | Nov. 4, 1947 |
| 2,456,864 | Cole | Dec. 21, 1948 |
| 2,699,487 | Turner | Jan. 11, 1955 |